US011675818B2

(12) United States Patent
Huang et al.

(10) Patent No.: US 11,675,818 B2
(45) Date of Patent: Jun. 13, 2023

(54) COSMIC SPACE DATA SYSTEM, METHOD, COMPUTER DEVICE, AND STORAGE MEDIUM

(71) Applicant: Yajuan Huang, Beijing (CN)

(72) Inventors: Yajuan Huang, Beijing (CN); Feiran Chang, Beijing (CN)

(73) Assignee: Yajuan Huang, Beijing (CN)

( * ) Notice: Subject to any disclaimer, the term of this patent is extended or adjusted under 35 U.S.C. 154(b) by 0 days.

(21) Appl. No.: 17/618,876

(22) PCT Filed: Jun. 11, 2020

(86) PCT No.: PCT/CN2020/095571
§ 371 (c)(1),
(2) Date: Dec. 13, 2021

(87) PCT Pub. No.: WO2020/249039
PCT Pub. Date: Dec. 17, 2020

(65) Prior Publication Data
US 2022/0261424 A1 Aug. 18, 2022

(30) Foreign Application Priority Data

Jun. 13, 2019 (CN) .......................... 201910509981.5
Apr. 29, 2020 (CN) .......................... 202010355309.8

(51) Int. Cl.
*G06F 16/28* (2019.01)
(52) U.S. Cl.
CPC ................... *G06F 16/288* (2019.01)
(58) Field of Classification Search
CPC ..................................................... G06F 16/288
See application file for complete search history.

(56) References Cited

U.S. PATENT DOCUMENTS 8,033,450 B2 * 10/2011 Stierman .................. G09F 3/00
235/487
2008/0034426 A1 * 2/2008 Stierman .............. G07D 7/2033
726/22

(Continued)

FOREIGN PATENT DOCUMENTS

CN       101278294       10/2008
CN       101261865       7/2012

(Continued)

OTHER PUBLICATIONS

Battaglieri M, Belloni A, Chou A, Cushman P, Echenard B, Essig R, Estrada J, Feng JL, Flaugher B, Fox PJ, Graham P. US cosmic visions: new ideas in dark matter 2017: community report. arXiv preprint arXiv: 1707.04591. Jul. 14, 2017. (Year: 2017).*

(Continued)

*Primary Examiner* — Mohsen Almani
(74) *Attorney, Agent, or Firm* — Loza & Loza, LLP; Michael F. Fedrick

(57) ABSTRACT

The present disclosure relates to the field of cosmic space data technology, in particular to a cosmic space data system, a method, a computer device and a storage medium. The system comprises: a data import unit configured to store input microparticle-related data according to types of microparticles; an annotating unit configured to annotate the stored microparticle-related data; and a feature association unit configured to establish an association relationship of the stored microparticle-related data according to the annotation. In the embodiments of the present application, relevant data of a plurality of microparticles can be simultaneously stored in one system, and researchers can acquire data related to a variety of microparticles from this system according to research needs, so that the researchers can quickly obtain the required microparticle-related data by (Continued)

means of a feature relationship between the microparticle-related data.

7 Claims, 7 Drawing Sheets

(56) References Cited

U.S. PATENT DOCUMENTS

| | | | | |
|---|---|---|---|---|
| 2013/0088493 | A1* | 4/2013 | Hao | G06T 11/203 |
| | | | | 345/440 |
| 2013/0325924 | A1* | 12/2013 | Moshfeghi | H04L 67/12 |
| | | | | 709/203 |
| 2018/0336513 | A1* | 11/2018 | Smith | G05B 19/406 |
| 2019/0121782 | A1* | 4/2019 | Sun | G06N 20/00 |
| 2020/0034989 | A1* | 1/2020 | Koyama | H04N 13/243 |
| 2020/0196095 | A1* | 6/2020 | Smith | H04W 64/003 |
| 2021/0145931 | A1 | 5/2021 | Baker et al. | |
| 2022/0129835 | A1* | 4/2022 | Alsayar | G06Q 50/02 |

FOREIGN PATENT DOCUMENTS

| | | |
|---|---|---|
| CN | 104199848 A | 12/2014 |
| CN | 104252665 | 12/2014 |
| CN | 104572645 A | 4/2015 |
| CN | 104657459 | 5/2015 |
| CN | 106228165 A | 12/2016 |
| CN | 108959247 A | 12/2018 |
| JP | 2002163299 | 6/2002 |

OTHER PUBLICATIONS

Bernardini, Elisa, Marek Kowalski, and Carlos de los Heros. "Search for neutrinos from annihilating dark matter in galaxies and galaxy clusters with the IceCube detector." (2018). (Year: 2018).*

Xue W, Luo Q, Chen L, Liu Y. Contour map matching for event detection in sensor networks. InProceedings of the 2006 ACM SIGMOD international conference on Management of data Jun. 27, 2006 (pp. 145-156). (Year: 2006).*

Cheng, Long, Boudewijn F. Van Dongen, and Wil MP Van Der Aalst. "Efficient event correlation over distributed systems." 2017 17th IEEE/ACM International Symposium on Cluster, Cloud and Grid Computing (CCGRID). IEEE, 2017. (Year: 2017).*

Reguieg, Hicham, et al. "Event correlation analytics: scaling process mining using mapreduce-aware event correlation discovery techniques." IEEE Transactions on Services Computing 8.6 (2015): 847-860. (Year: 2015).*

International Search Report, International Patent Application No. PCT/CN2020/095571 dated Aug. 18, 2020.

First Office Action dated Jun. 30, 2021 for counterpart Chinese patent application No. 202010355309.8.

First search report dated Jun. 30, 2021 for counterpart Chinese patent application No. 202010355309.8.

Second Office Action dated Aug. 20, 2021 for counterpart Chinese patent application No. 202010355309.8.

Extended European Search Report dated Nov. 14, 2022 for counterpart European Patent Application No. 20822912.0.

Anoymous: ESA-Planck, XP055939421, Jan. 1, 2022pp. 1-6, retrieved from the Internet on Jul. 6, 2022, URL: https://www.esa.int/Science_Exploration/Space_Science/Planck.

Konrad Bernloehr, Cosmic ray/Gamma ray/Neutrino experiments, Feb. 20, 2020, pp. 1-14, XP055939424, Retrieved from the Internet on Jul. 6, 2022, URL:https://www.mpi-hd.mpg.de/hfm/CosmicRay/CosmicRaySites.html.

* cited by examiner

COSMIC SPACE DATA SYSTEM, METHOD, COMPUTER DEVICE, AND STORAGE MEDIUM

CROSS-REFERENCE TO RELATED APPLICATIONS

This application is a National Stage of International Patent Application No. PCT/CN2020/095571, filed Jun. 11, 2020, which claims priority to Chinese Patent Application No. 202010355309.8, filed Apr. 29, 2020, both of which are hereby incorporated by reference in their entireties.

FIELD OF THE INVENTION

The present disclosure relates to the field of cosmic space data technology, in particular to a cosmic space data system, a method, a computer device and a storage medium.

BACKGROUND OF THE INVENTION

In studies of observation activities of space science such as cosmic movement, observations and records are made for different microparticles and corresponding theoretical researches are carried out, e.g., observations of microparticles such as subatoms, neutrinos, phonons (bosons), or the like, and corresponding theoretical literatures. Even for some theoretical microparticles, such as strings (based on string theory), there also exist corresponding observation data and theoretical analysis data. A large amount of observation data and corresponding theoretical research results do not constitute a corresponding system, which is not conducive to relevant researchers or institutions to acquire the observation data and diffuse the theoretical research results. At present, there is an urgent need for a collection that can classify observation data and theoretical research results for a plurality of microparticles, so that the researchers can use and enrich existing observation data and theoretical research of microparticles.

SUMMARY OF THE INVENTION

In order to solve the technical problems in the prior art, the embodiments of the present disclosure provide a cosmic space data system, a method, a computer device and a storage medium, which can classify and summarize relevant data of a plurality of microparticles to form an orderly and recognizable data system, thereby facilitating researchers to conduct research.

The embodiments herein provide a cosmic space data system, comprising:

a data import unit configured to store input microparticle-related data according to types of microparticles;

wherein the data import unit further comprises: an code mapping module configured to map string-related data into code X, map subatom-related data into code Y, map neutrino-related data into code Z, and map phonon-related data into code S; and a metadata import module configured to store the string-related data in a database space X, store the subatom-related data into a database space Y, store the neutrino-related data in a database space Z, and store the phonon-related data in a database space S;

an annotating unit configured to annotate the stored microparticle-related data; and a feature association unit configured to establish an association relationship of the stored microparticle-related data according to the annotation.

The embodiments herein also provide a method of collecting cosmic space data, comprising:

storing input microparticle-related data according to types of microparticles, wherein string-related data are mapped into code X, subatom-related data are mapped into code Y, neutrino-related data are mapped into code Z, and phonon-related data are mapped into code S; the string-related data are stored in a database space X, the subatom-related data are stored into a database space Y, the neutrino-related data are stored in a database space Z, and the phonon-related data are stored in a database space S;

annotating the stored microparticle-related data; and establishing an association relationship of the stored microparticle-related data according to the annotation.

The embodiments herein also provide a computer device, comprising: a memory, a processor, and a computer program stored in the memory and running on the processor, and the system is implemented when the processor executes the computer program.

The embodiments herein also provide a computer-readable storage medium having a computer program stored on the computer-readable storage medium, and the system is implemented when the computer program is executed by a processor.

In the embodiments of the present disclosure, the relevant data of a variety of microparticles can be simultaneously stored in one system, the researchers can acquire the relevant data of a variety of microparticles from the system according to research needs, and the researchers can obtain the required microparticle-related data quickly through a feature relationship between the microparticle-related data.

BRIEF DESCRIPTION OF THE DRAWINGS

In order to more clearly explain the technical solutions in the embodiments of the present disclosure or the prior art, the drawings required to be used in the description of embodiments or prior art are briefly introduced below. Obviously, the drawings in the description below are only some embodiments herein. For those skilled in the art, other drawings can also be obtained based on these drawings without creative effort.

DETAILED DESCRIPTION OF THE INVENTION

It should be noted that the embodiments in the present disclosure and the features in the embodiments can be combined with each other if there is no conflict. Hereinafter, the present disclosure will be described in detail with reference to the drawings and in conjunction with the embodiments.

The technical solutions in the embodiments herein are clearly and completely described below in conjunction with the drawings in the embodiments herein. Obviously, the described embodiments are only a part of the embodiments herein, rather than all the embodiments. Based on the embodiments herein, all other embodiments obtained by those skilled in the art without creative effort shall fall within the scope of protection herein.

The microparticles herein can include, for example, strings, subatoms, neutrinos and phonons and may also include other discovered microparticles or undiscovered microparticles.

Strings: string theory is a theory in theoretical physics. It is believed in the theory that basic units of nature are not only microparticles such as subatoms, neutrinos, or the like, and that these things that look like particles are composed of closed loops of smaller strings (called closed strings), and different vibrations and motions of closed strings produce a variety of observed elementary particles.

Subatoms refer to a standard model of material level of microparticles smaller than atoms, i.e., elementary particles such as electrons, neutrons, protons, mesons, quarks, gluons, photons, or the like. The physical sciences that study such microscopic particles are called subatomic physics. Theorists use state vectors in Hilbert space to describe those elementary particles. The currently known standard model is a quantum field theory containing 47 elementary particles.

Neutrinos refer to an elementary particle in the universe that is not charged, has a very light mass, can freely traverse the earth, and has very weak interactions with other substances. It widely exists in nature and is also known as fermions. The research results of microparticle physics show that each neutrino has its corresponding antimatter. The nuclear reaction involving the weak interactions inside the Sun produces a large number of neutrinos, which flow unimpeded into space. There are billions of neutrinos passing through our eyes per second, and trillions of neutrinos passing through everyone's body. At present, a detector mainly records a speed of movement, a process of decay, and whether neutrinos have quality or not.

Phonons refer to a quasi-particle excited by quantization of a collective oscillation mode of a crystal structure in a crystal, also known as bosons. A coordinate position, a momentum and a motion equation of an oscillating wave are used in dynamics for description, and an annihilation operator is used to express a lifetime of phonons as quasi-particles.

Figure 1:
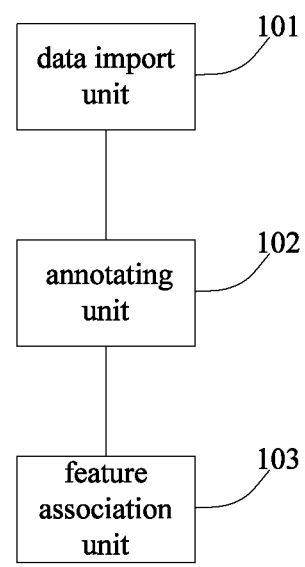
FIG. 1 is a schematic structural diagram illustrating a cosmic space data system according to an embodiment of the present disclosure.

FIG. 1 is a schematic structural diagram illustrating a cosmic space data system according to an embodiment of the present disclosure. In this embodiment, a system where observation data of a plurality of microparticles in the universe and a corresponding theoretical research are stored is provided. The relevant data of different microparticles, such as observation data and theoretical research data, are stored according to types of microparticles, and all the stored data have corresponding tags by annotating the stored data, so as to establish correlations among a plurality of the same type of microparticle-related data, thus it is convenient for the researchers to use the microparticle-related data and an input interface is provided for the researchers to enrich relevant data of some microparticles. In this embodiment, each unit or module can be implemented by a software module, or can also be implemented by a distributed computer cluster, or functions of the unit or module can also be implemented by a general-purpose chip. The unit or module specifically includes:

a data import unit 101 configured to store input microparticle-related data according to types of microparticles;

an annotating unit 102 configured to annotate the stored microparticle-related data; and a feature association unit 103 configured to establish an association relationship of the stored microparticle-related data according to the annotation.

Through the system in the above structure, the relevant data of a variety of microparticles can be simultaneously stored in one system. The researchers can acquire the relevant data of a variety of microparticles from the system according to research needs and the researchers can obtain the required microparticle-related data quickly through a feature relationship between the microparticle-related data.

Figure 2:
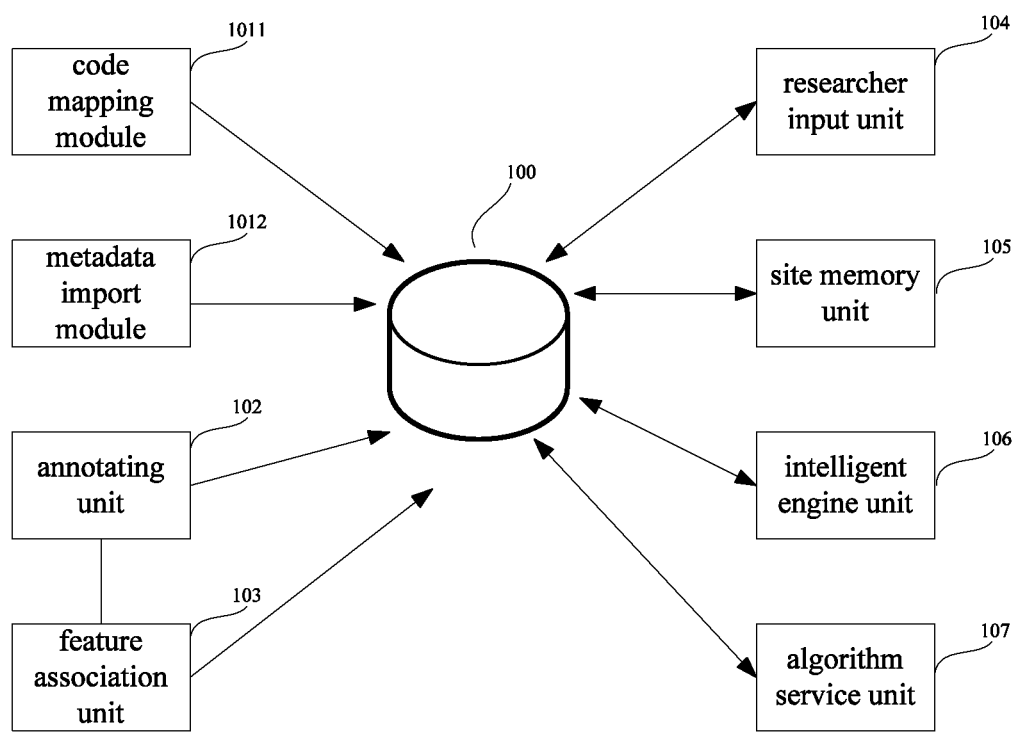
FIG. 2 is a detailed schematic structural diagram illustrating a cosmic space data system according to an embodiment of the present disclosure.

FIG. 2 is a detailed schematic structural diagram illustrating a cosmic space data system according to an embodiment of the present disclosure, in which a structure of each unit in the system is further described. The system also comprises a database 100 for storing microparticle-related data. The data import unit 101 further comprises: an code mapping module 1011 and a metadata import module 1012. The cosmic space data system in the embodiments herein further comprises: a researcher input unit 104, a site memory unit 105, an intelligent engine unit 106, and an algorithm service unit 107.

As an aspect of the embodiments herein, the data import unit 101 further comprises: an code mapping module 1011 and a metadata import module 1012, where the code mapping module 1011 is configured to map relevant data of different microparticles into a code; and the metadata import module 1012 is configured to store relevant data of microparticles into a database space code mapped correspondingly.

In this embodiment, the microparticle-related data can include observation data and theoretical research data. In the process of data import, only the observation data of microparticles can be imported, or only the theoretical research data of microparticles can be imported, or the observation data and the theoretical research data of microparticles can be simultaneously imported. Moreover, the relevant data of different microparticles can also be encoded and mapped to generate identity IDs of four types of microparticles: X (strings), Y (subatoms), Z (neutrinos) and S (phonons), among which, the identity IDs of the microparticles can be, for example, area code+time stamp+feature attribute+other distinguishing code, where the area code can be a code of a specified block in a storage medium, and a sequential encoding method can be adopted for the code as required. The feature attribute includes identifiers of XYZS microparticles, e.g., an code X identifier represents strings, and can also include scene modeling attributes, business operation attributes, or the like, where the scene modeling attributes can further include attributes such as a researcher input, a site memory, an intelligent engine, and an algorithm service, which are used to mark a functional unit from which the relevant data of the microparticles are derivable; and the business operation attributes can further include attributes such as public media, which are used to mark that the microparticle-related data are derivable from public media. The other distinguishing code can be identifiers of a variety of state machines, which are used to distinguish the microparticle-related data, e.g., who operates a read status ID/a write status ID, and who invokes a process status ID of a role policy. For example, existing two or more microparticles can be encoded and mapped, and corresponding microparticle-related data can be stored in a database space code mapped correspondingly. The metadata import module can also import the microparticle data observed by different observation stations, institutions, individuals and the microparticle theoretical research data through different data channels, and the data channels can be parallel channels. That is to say, different types of microparticle-related data can be simultaneously stored in the corresponding database space, and a write permission is enabled in the database space to write the imported microparticle-related data.

As an aspect of the embodiments herein, the code mapping module 1011 further maps string-related data into code X, maps subatom-related data into code Y, maps neutrino-related data into code Z, and maps phonon-related data into code S.

The metadata import module 1012 further stores the string-related data in a database space X, stores the subatom-related data in a database space Y, stores the neutrino-related data in a database space Z, and store the phonon-related data in a database space S.

In this embodiment, the data import unit 101 can only receive two or more of the four types of XYZS microparticles. Therefore, the code mapping module 1011 in the data import unit 101 can only map the received string-related data and subatom-related data into code X and code Y, or map the subatom-related data and neutrino-related data into code Y and code Z, or map the string-related data, subatom-related data, and phonon-related data into code X, code Y, and code S. The microparticles that have not been received are mapped into NULL.

As an aspect of the embodiments herein, the annotating unit 102 is further configured to annotate sources, data content, and theoretical research data of the stored microparticle-related data.

The sources of the microparticle-related data further include provider information and source auxiliary information of the microparticle-related data. The provider information can include, for example, a name (or number) of a research institution, a name (or number) of a research project. The source auxiliary information can include, for example, information such as a device type (or number), configuration parameters of the device, and a certifier. The data content further includes: observation events and observation data. The data content can also include: a discovery process, a data accuracy, a data format, a base point, a vector trajectory, and a unit ruler. For example, when research institutions record data, their data are generally derived from results of experimental equipment or instrument, or inferred from experimental models, then the base point is derived from a calibration method of the device (instrument). That is to say, the base point is a starting point of measurement of a reference object, the unit ruler is the recorded data, and the vector trajectory is generally obtained by plotting with dynamic data. The theoretical research data can further include content of opinions and information of an opinion publisher (which can be an individual or an institution), where the content of opinions can be stored in forms of papers, signed articles, research reports, or the like. The annotating unit 102 can also annotate a time stamp of the microparticle-related data to record the sources, the data content, and the input time of the opinions of the microparticle-related data. In addition, the annotating unit 102 can also be configured to record behaviors of operating the microparticle-related data, for example, who has invoked which microparticle-related data and generated what data (such as theoretical research data) in what roles (such as an ordinary user or a registered member) at what time, where and under what scenarios. These behaviors of operating microparticle-related data can serve managements of cognitive changes.

The observation data in the microparticle-related data include the sources and data content of the microparticle-related data and the theoretical research data in the microparticle-related data include the opinions. Of course, the observation data of the microparticle-related data may include all of the data sources and data content, or may only include a portion thereof. The theoretical research data may also include all of the opinions, or may only include a portion thereof. The time stamp may belong to the theoretical research data, or the observation data, or the theoretical research data and the observation data have the time stamp, respectively.

As an aspect of the embodiments herein, the feature association unit 103 is further configured to associate sources of the same type of microparticles, associate data content of the same type of microparticles, and associate theoretical research data of the same type of microparticles.

In this embodiment, an association relationship of the relevant information of the microparticles is established according to annotation information of the relevant information of the same type of microparticles, other relevant data related to one of the relevant data (sources, data content, theoretical research data) can be found according to the association relationship, which can facilitate the researchers to make full use of the microparticle-related data. In an initial database establishment state, the data import unit generates an identity ID of microparticle-related data and completes a metadata import by a specific parallel channel. This original association management and association relationship are completed by the feature association unit. Feedbacks and supplements of a caller and a visitor after metadata processing are also clustered and managed by the feature association unit. A sub-database operation management of an initial database, an alternative database, a comprehensive knowledge database, an application scenario database and a business operation database are also realized by the feature association unit.

In order to illustrate the steps more clearly, examples can be cited:

When a researcher obtains observation data D (which can be one of four types of microparticles such as X, Y, Z and S, or mixed data of some types of microparticles) of an observation event C from an institute A using an instrument B, the researcher can also find observation data D' obtained by another institute E using an instrument F based on the same observation event C as this observation event. At this time, the researcher can study the observation event C by comparing the observation data D and D'.

When the researcher finds an opinion and information of an opinion publisher, other opinions of the opinion publisher, and sources and data content of microparticle-related data related to each opinion can be obtained based on the information of the opinion publisher. Alternatively, information of other opinion publishers who hold the same opinions as this opinions, and sources and data content of corresponding microparticle-related data can be found according to the opinions.

As an aspect of the embodiments herein, associating sources of relevant data of the same type of microparticles, associating data content of the same type of microparticles, and associating theoretical research data of the same type of microparticles further comprise:

adding a flag bit to sources, data content and theoretical research data of the same type of microparticle-related data; and writing the same mark in a corresponding flag bit, when the sources, data content or theoretical research data of microparticle-related data are the same.

In this embodiment, a stacking method can also be adopted to establish an association relationship of microparticle-related data. For example, after a researcher acquires microparticle-related data, the microparticle-related data related to research are pushed onto stacks. At this time, the microparticle-related data may be extremely rich, and include a variety of contents. However, the researcher may only push a part of the microparticle-related data onto stacks. For example, only observation events, observation instruments, observation instrument parameters, and results of observation instruments are required. Information such as research institutions and research projects are not required. The required data content only needs to be pushed onto stacks, where different stacks can be formed according to a researcher's ID, an ID of the acquired microparticle-related data, and types of microparticles. The researcher conducts research based on the microparticle-related data in the stacks, and then obtains a research result (i.e., theoretical research data). The feature association unit 103 associates data items of the microparticle-related data in the stacks with the corresponding theoretical research data. That is to say, the data items of the microparticle-related data in the stacks form an association relationship with the corresponding theoretical research data.

As an aspect of the embodiments herein, a researcher input unit 104 configured to write new microparticle-related data in microparticle-related data specified by the researcher is also included.

Figure 3A:
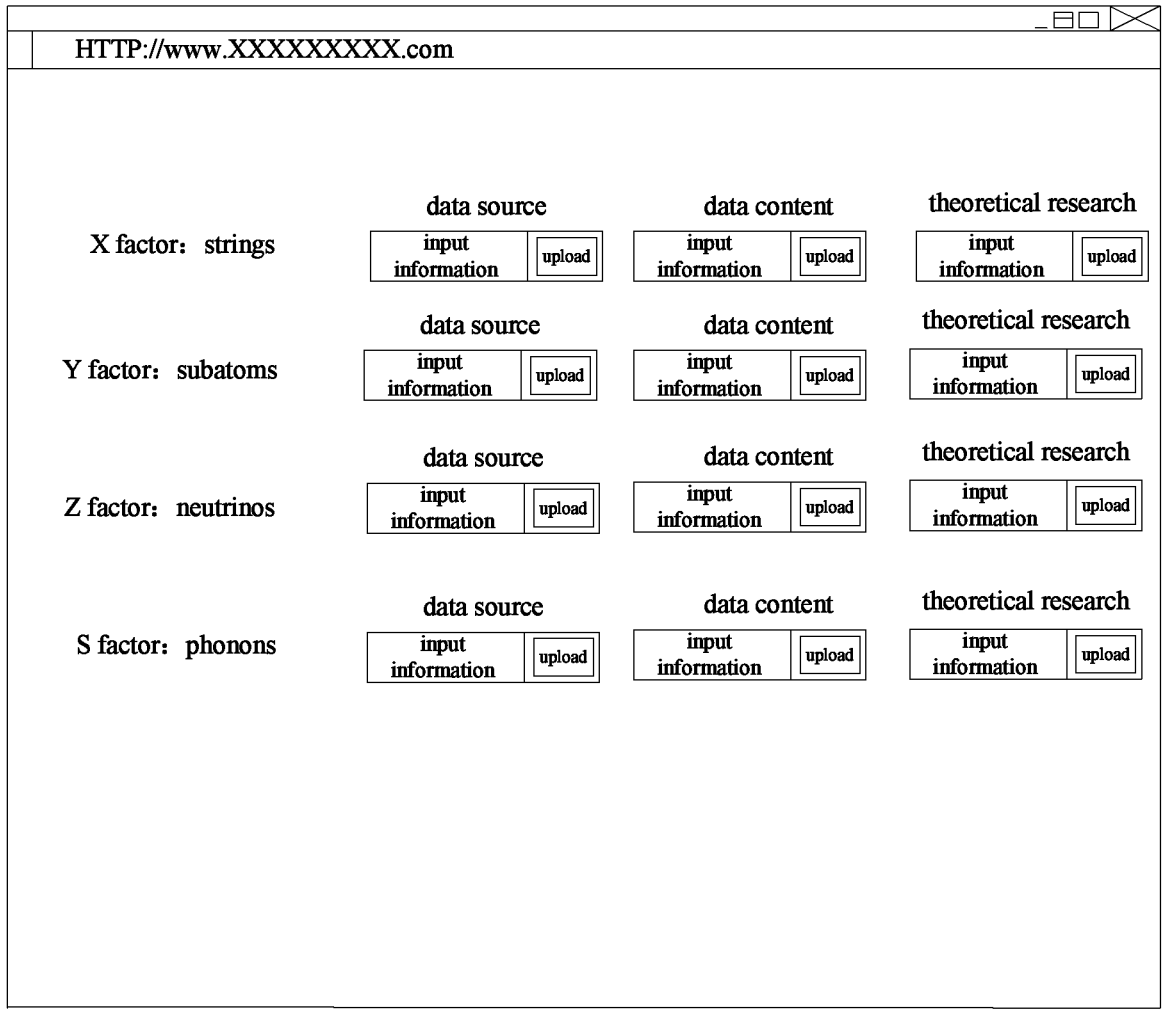
FIG. 3A is an interface schematic diagram illustrating a researcher input unit according to an embodiment of the present disclosure.

In this embodiment, for example, a researcher uses Hawking's nutshell theory to construct a microparticle verification experiment. During the period, it is necessary to call an identity ID of a certain type of microparticle and microparticle data of a corresponding channel, and to understand variable data in the verification process. The researcher establishes new theoretical research data through the researcher input unit 104, conducts experiments by calling the corresponding microparticle-related data, and records these microparticle-related data for the new theoretical research, thereby forming a complete data record of the new theoretical research (including the microparticle-related data and the new theoretical research data). The researcher can input the researcher's microparticle theory research data into the corresponding microparticle-related data through a graphical user interface (GUI) such as a web interface shown in FIG. 3A or an interface of an application software. In this embodiment, the researcher obtains new opinions by studying microparticle observation data in the microparticle-related data, then the researcher can enrich the theoretical research data with the observation data, and retain his information, such as name, contact number, or the like. Or the researcher's observation data can also be stored in the microparticle-related data.

Figure 3B:
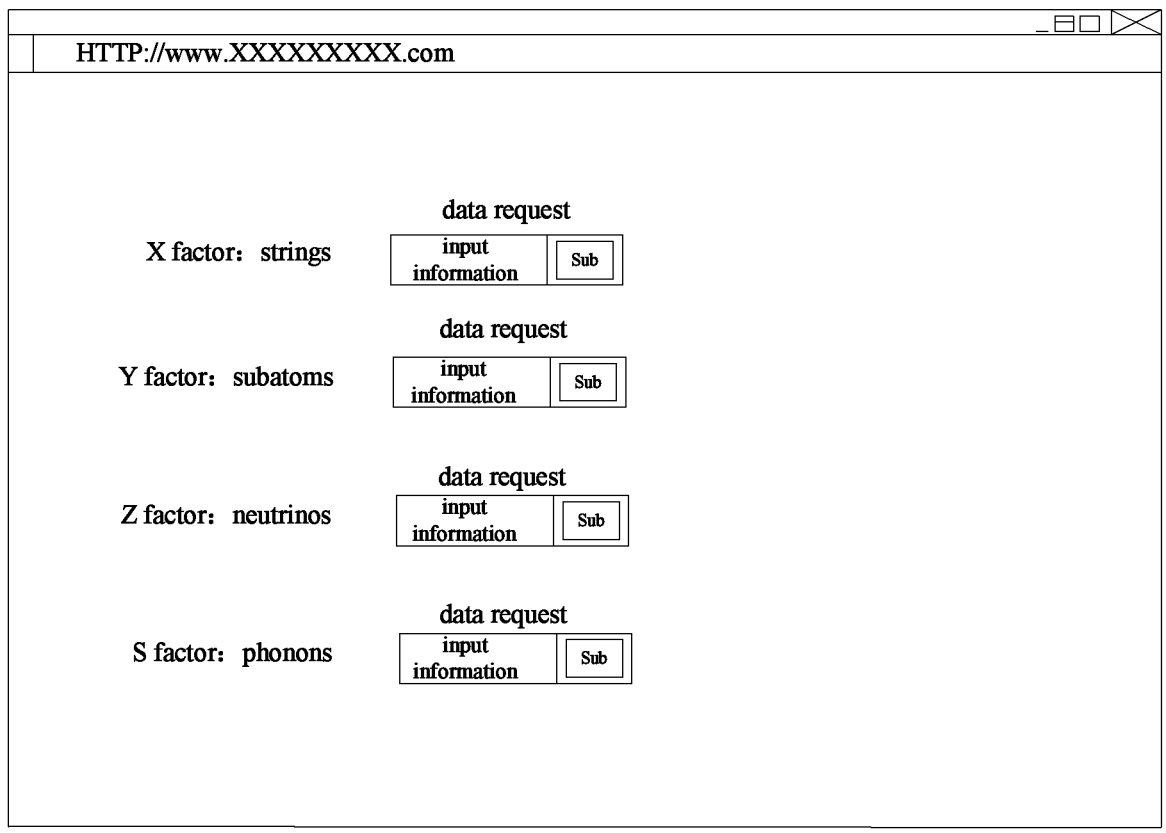
FIG. 3B is an interface schematic diagram illustrating another researcher input unit according to an embodiment of the present disclosure.

Alternatively, a graphical user interface (GUI) such as a web interface as shown in FIG. 3B or an application software interface can be used to input the researcher's demand information into the microparticle-related data. In other words, the researcher input unit 104 herein can provide researchers or institutions with an interface for inputting the microparticle-related data, so that all the researchers can enrich the interested microparticle-related data.

As an aspect of the embodiments herein, the site memory unit 105 configured to provide a researcher with a horizontal comparison of microparticle-related data and a historical comparison of microparticle-related data is also included.

In this embodiment, providing a researcher with a horizontal comparison of microparticle-related data refers to that based on observation conditions, observation times, observation locations, and types of microparticles, observation data and theoretical research data in similar observation conditions, observation times, observation locations and microparticle-related data of the same type of microparticle are compared horizontally, so that the researcher can compare the effects of observation conditions, observation times, and observation locations on the observation data. The observation conditions can include weather conditions during the observation, an instrument type using for the observation, instrument parameters during the observation, and can also be based on observation events. In this way, the observation data and theoretical research data can be horizontally compared based on the same observation event.

Providing a researcher with a historical comparison of microparticle-related data refers to comparing observation data of a certain type of microparticle at a plurality of observation times based on observation times and types of microparticles. Comparison conditions such as observation events, observation locations, and observation conditions can be further added. That is to say, the observation data and theoretical research data of the same observation event in certain microparticle-related data at similar observation locations and observation conditions can be compared. Therefore, the researcher can make comparisons conveniently based on historical observation data.

As an aspect of the embodiments herein, the intelligent engine unit 106 configured to connect an external observation device and perform a data interaction with the external observation device is also included.

In this embodiment, a data interaction between an intelligent engine unit and an external observation device means that the external observation device can acquire the microparticle-related data in the system herein through the intelligent engine unit 106 for the external device to observe microparticles, and the external observation device can also input the microparticle-related data to the system herein observation data of a certain type of microparticle, and can also include data such as an instrument type and instrument parameters during the observation, so as to enrich the microparticle-related data of the system herein.

The external observation device in this embodiment is an observation device that can be driven remotely by a program. For example, the observation device can be connected through a network, and the observation device can be driven by issuing instructions to perform an observation according to the specified parameters and time.

Figure 4:
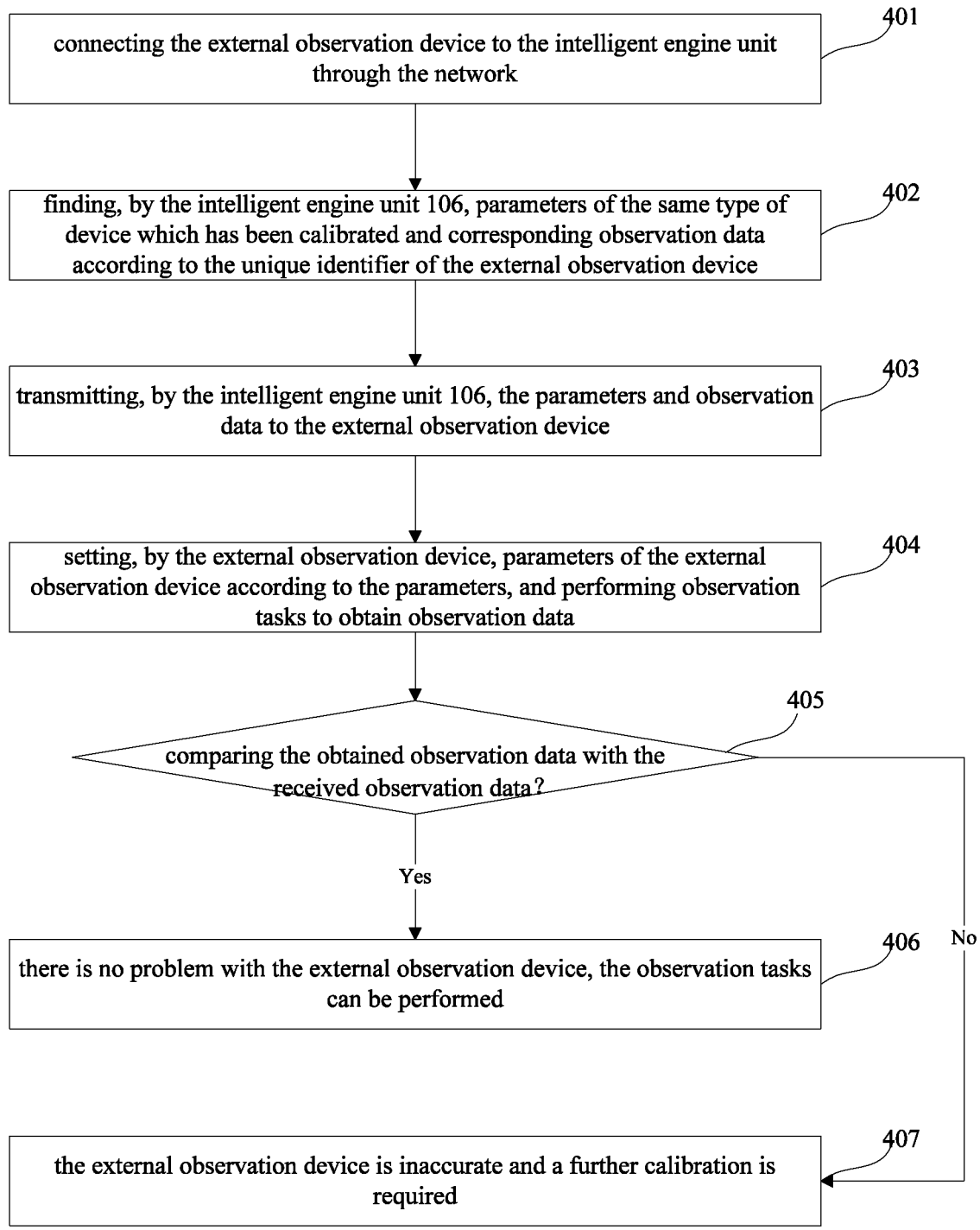
FIG. 4 is a flow chart illustrating an intelligent engine unit calibrating an external observation device according to an embodiment of the present disclosure.

FIG. 4 is a flow chart illustrating an intelligent engine unit calibrating an external observation device according to an embodiment of the present disclosure. In this figure, the process of calibrating, by the intelligent engine unit, the external observation device is specifically described:

Step 401: connecting the external observation device to the intelligent engine unit 106 through the network.

In this step, the intelligent engine unit 106 can be notified of information of the external observation device by reporting a unique identifier which can include a type of the external observation device and other information to the intelligent engine unit 106.

In step 402, finding, by the intelligent engine unit 106, parameters of the same type of device which has been calibrated and corresponding observation data according to the unique identifier of the external observation device (these data can be stored in the intelligent engine unit 106 by the same type of other external observation device after calibration through the network).

In step 403, transmitting, by the intelligent engine unit 106, the parameters and observation data to the external observation device.

In step 404, setting, by the external observation device, parameters of the external observation device according to the parameters, and performing observation tasks to obtain observation data.

Step 405: comparing the obtained observation data with the received observation data.

If the comparison results are consistent, proceed to Step 406. If the comparison results are inconsistent, it means that the external observation device is inaccurate and a further calibration is required, proceed to Step 407.

Step 406: if the comparison results are consistent, it means that there is no problem with the external observation device, the observation tasks can be performed. The external observation device can display this information to an administrator for subsequent operations.

Step 407: if the comparison results are inconsistent, it means that the external observation device is inaccurate and a further calibration is required. At this time, information indicating that a further calibration is required can be transmitted to the administrator of the external observation device (this information can be obtained when the external observation device is connected to the intelligent engine unit 106). Alternatively, the external observation device can be automatically calibrated by adjusting the parameters of the external observation device.

The intelligent engine unit 106 of the embodiments herein can set constraint conditions to control operations of the external observation device. In this embodiment, the external observation device is not always in an observation state, but needs to determine whether the observation conditions meet the constraint conditions. The constraint conditions can be that when a certain (some) observation value(s) of the observed microparticles falls within a certain range of threshold values, the observation device (instrument) runs silently, and the observation data are recorded in a normal channel. When a certain (some) observation value(s) of this microparticle exceeds the range of threshold values, warnings are triggered, emergency procedures are started, and batch actions are triggered and call associations are complicatedly invoked. For example, a certain (some) specific observation device(s) or computing device(s) is/are turned on, or researchers are notified of. If the constraint conditions are met, the external observation device starts the observation tasks, or the first external observation device is notified to start the observation tasks according to whether other second external observation devices (which may be the other second external observation devices exceeding a certain proportion) connected thereto start the observation tasks. For example, there exist a plurality of second external observation devices related to the first external observation device. When the second external observation devices start to perform the observation tasks, a notification is transmitted to the intelligent engine unit 106. When the intelligent engine unit 106 counts more than half of the second external observation devices performing the observation tasks, the first external observation device connected thereto is notified to start to perform the observation tasks, such that energy and losses of corresponding observation devices can be saved.

As an aspect of the embodiments herein, the algorithm service unit 107 configured to connect an external computing device and perform a data interaction with the external computing device is also included.

In this embodiment, a data interaction between an algorithm service unit 107 and an external computing device means that the external computing device can be connected to the algorithm service unit 107 via the Internet, the algorithm service unit 107 obtains microparticle-related data, and the external computing device inputs the microparticle-related data into a mathematical model in the external computing device for analyses and calculations, so that an analysis result based on the microparticle-related data can be obtained. The mathematical model can be, for example, a mathematical model that converts low-dimensional data of microparticles into high-dimensional data. The external computing device can also transmit results of analyses and calculations to the system herein through the algorithm service unit 107, and store the results of analyses and calculations in the corresponding microparticle-related data, and can also input the mathematical model or algorithm used by the external computing device to the database of the system herein for storage, thereby enriching the microparticle-related data.

Through the algorithm service unit 107, the system herein provides the external computing device, such as computers, computer clusters with microparticle observation data and corresponding theoretical research data for theoretical research, including specific observation data and a variety of different algorithms models, and provides input interfaces for microparticle-related data to external computing devices. The algorithm model, calculation process, and results of calculations and analyses of the external computing devices can be collected by this algorithm service unit 107, which can further enrich the microparticle-related data in the database, so as to facilitate reference and participation of other researchers.

Figure 5:
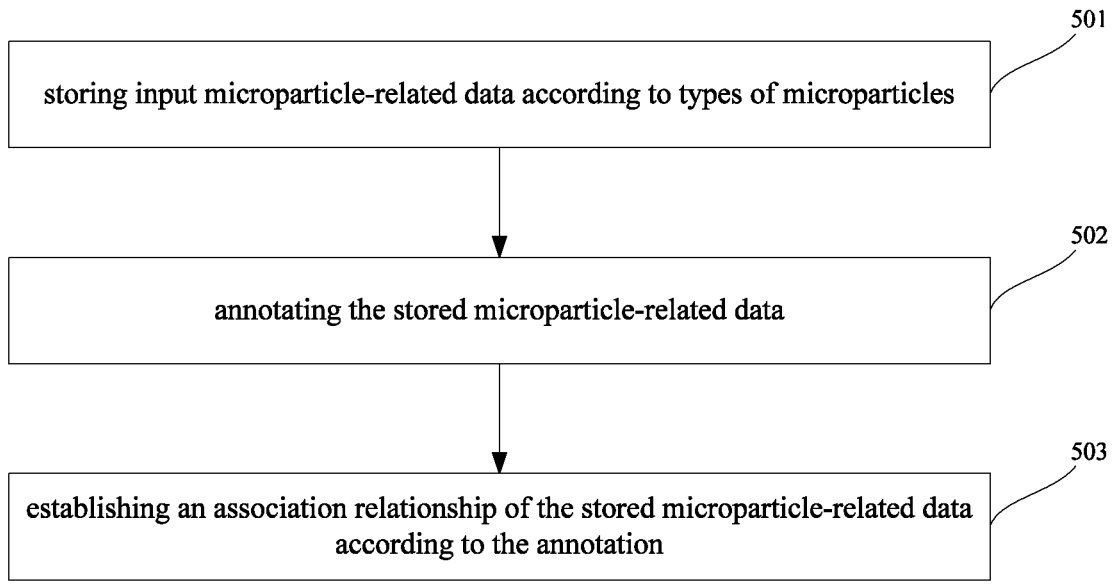
FIG. 5 is a flow chart illustrating a method of collecting cosmic space data according to an embodiment of the present disclosure.

FIG. 5 is a flow chart illustrating a method of collecting cosmic space data according to an embodiment of the present disclosure. In this embodiment, concepts of elementary particles in the universe are clearly delimited by classifying and recording a plurality of microparticles, and classification and storage of microparticles can help researchers to learn about the relevant data of different microparticles more quickly, which is conducive to the progress of research. The method specifically comprises the steps of:

Step 501: storing input microparticle-related data according to types of microparticles;

Step 502: annotating the stored microparticle-related data; and

Step 503: establishing an association relationship of the stored microparticle-related data according to the annotation.

As an aspect of the embodiments herein, the Step 501 further comprises:

encoding and mapping relevant data of different microparticles; and storing the relevant data of the microparticles into a corresponding code database space.

As an aspect of the embodiments herein, encoding and mapping relevant data of different microparticles further comprises:

mapping string-related data into code X, mapping subatom-related data into code Y, mapping neutrino-related data into code Z, and mapping phonon-related data into code S;

storing microparticle-related data into a corresponding code database space further comprises, storing the string-related data in a database space X, storing the subatom-related data in a database space Y, storing the neutrino-related data in a database space Z, and storing the phonon-related data in a database space S.

As an aspect of the embodiments herein, annotating the stored microparticle-related data further comprises:

annotating sources, data content, and theoretical research data of the stored microparticle-related data.

As an aspect of the embodiments herein, establishing an association relationship of the stored microparticle-related data according to the annotation further comprises:

associating sources of relevant data of the same type of microparticles, associating data content of the same type of microparticles, and associating theoretical research data of the same type of microparticles.

As an aspect of the embodiments herein, associating sources of relevant data of the same type of microparticles, associating data content of the same type of microparticles, and associating theoretical research data of the same type of microparticles further comprises:

adding a flag bit to sources, data content and theoretical research data of the same type of microparticle-related data, and writing the same mark in a corresponding flag bit, when the sources, data content or theoretical research data of microparticle-related data are the same.

As an aspect of the embodiments herein, a researcher input step to write new microparticle-related data in specified microparticle-related data is also included.

As an aspect of the embodiments herein, a site memory step to provide a researcher with a horizontal comparison of microparticle-related data and a historical comparison of microparticle-related data is also included.

As an aspect of the embodiments herein, an intelligent engine step to perform a data interaction with the external observation device is also included.

As an aspect of the embodiments herein, an algorithm service step to perform a data interaction with the external computing device is also included.

In the method in the embodiments herein, a plurality of microparticles can be classified for storage and management, and the researcher can be provided with an access interface, via which the microparticle-related data can be input into the system, or the system can be used to acquire the microparticle-related data for theoretical research, and researchers can easily obtain relevant data of microparticles by annotating and associating microparticle-related data.

Figure 6:
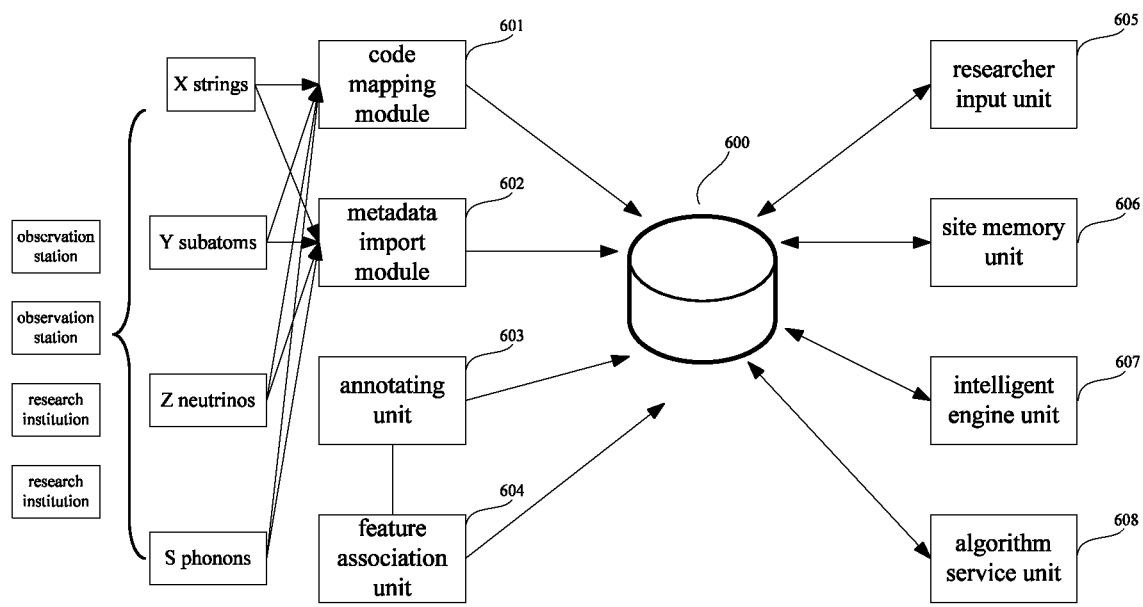
FIG. 6 is a schematic structural diagram illustrating a cosmic space data system according to an embodiment of the present disclosure.

FIG. 6 is a schematic structural diagram illustrating a cosmic space data system according to an embodiment of the present disclosure. In this embodiment, four types of microparticles are used as an example to establish a data system. The microparticles in this embodiment include: strings, subatoms, neutrinos, and phonons, among which, Strings: an initial cognitive space of microparticle matters relies on a material space that humans can directly perceive, that is, a three-dimensional geographic coordinate space. The provided data description is observed and recorded in string theory, and annotated as strings.

The strings are used to describe a position measurement of the universe. The measurement uses mathematical notations that humans can understand and explain, or a recording mode of existing equipment. A higher dimension of a cognizable parallel space is related to a limitation of a cognitive object itself. When a cognitive unit sets limitations on its own, it stays in a lower dimensional space. The ten-dimensional space currently described in mathematics is limited by such a discipline of modern and contemporary mathematics.

Subatoms: the universe consists of elementary particles smaller than atoms. These elementary particles are collectively referred to as subatoms.

Currently known subatoms include: quarks, gluons, two types of photons (hadrons, nucleons), three types of electrons (muons, taus, leptons), where the leptons are subatoms lighter than the Planck energy scale, and a Higgs boson is a god particle with non-zero mass.

Neutrinos: an emergence of neutrinos is related to a proton decay activity of cosmic matter. Neutrinos are a type of fermions. The proton decay activity is related to formation of mass spectra of cosmic matter, which is chemically called the periodic table of elements.

The proton decay activity forms mass spectra of cosmic elements. A large-scale decay activity of cosmic body releases ray bursts and neutrinos may appear. For example, blazars of supernova decay release ray bursts and neutrinos appear. The neutrinos are a type of fermions.

Phonons: the smallest mechanical unit of particle motion in a multi-particle system such as crystals is called phonons. The phonons are related to the fusion of collisions or oscillating activities between cosmic matters and the phonons are a type of bosons.

The phonons are a quasi-particle unit from a ground state to an excited state in the multi-particle system of the universe and also called elementary excitations. A transition activity unit of an elementary excitation state is defined as a phonon and a fusion effect of the phonons forms a field.

The embodiments herein provide an code mapping module 601 for the four types of microparticles, which performs an code mapping of relevant data of a variety of microparticles received from each observation station or research institution. For example, it can be recognized by keywords (or through recognition of observation data format and observation data content) which of the four types of microparticles the received microparticle-related data are about, and the received microparticle-related data are mapped into corresponding characters. For example, when the received microparticle-related data are recognized as string-related data, the string-related data are mapped into code X. When the received microparticle-related data are recognized as subatom-related data, the subatom-related data are mapped into code Y. When the received microparticle-related data are recognized as neutrino-related data, the neutrino-related data are mapped into code Z. When the received microparticle-related data are recognized as phonon-related data, the phonon-related data are mapped into code S.

The observation data transmitted by an observation station or research institution may involve only a few microparticles, or all four microparticles. When the transmitted microparticle-related data do not include any of the microparticles, the relevant data of the microparticle recorded in a corresponding record is NULL.

Metadata refer to basic information marks made based on the phenomena observed by each observation station at runtime of space. The data obtained by each space station or universe observation center are imported into a data system of an XYZS cognitive framework composed of the four types of microparticles through a metadata import module 602. In this embodiment, four types of tool interfaces such as XYZS are preset. The interfaces of the four types of microparticles include an output source of the observation station as metadata, and a data system characterized by the XYZS cognitive framework is used as an input party. In some embodiments, due to the requirements of confidentiality isolation and professional protection, a third party can also be introduced to import metadata, that is, a metadata output source adapts the microparticle-related data output by the metadata output source to the metadata import module 602 of the embodiments herein through a data plug-in provided by a third party, which may involve converting a format of the microparticle-related data, and unifying an accuracy of the microparticle-related data. The observation data and/or theoretical research data of each observation station and research institution are imported by the metadata import module 602 into the database 600 space characterized by the XYZS cognitive framework according to the code of the respective microparticle-related data. That is to say, the X string-related data are stored in an X string database space, the Y subatom-related data are stored in a Y subatom database space, the Z neutrino-related data are stored into a Z neutrino database space, and the S phonon-related data are stored in an S phonon database space.

It can be seen from the drawings that the four types of microparticles in this embodiment are all encoded and annotated by the code mapping module 601, and each type of microparticles is recognized and annotated. The observation stations or research institutions that provide the four types of microparticles transmit the corresponding microparticle-related data to the metadata import module 602 through different channels for microparticles. For example, the string-related data are transmitted in an X channel, the subatom-related data are transmitted in a Y channel, the neutrino-related data are transmitted in a Z channel, and the phonon-related data are transmitted in an S channel, among which, the channels can be specifically named according to an actual situation.

The four types of microparticle-related data input by a plurality of observation stations or research institutions are recognized and annotated by an annotating unit 603, and the observation data and theoretical research data in each type of microparticle-related data are annotated. For example, the annotated observation data include a certain professional organization, a project team, a certain field expert group, and a certain instrument tool. The annotated theoretical research data include new views and opinions that have been proposed after interpretation of the observation data and other theoretical research data of the microparticles. All of the microparticle-related data are annotated by the content annotating unit 603. After the annotation is completed, the content of different parts of the relevant data of microparticles can include one or more following parts: types of microparticles, research institutions, research projects, instruments, certifiers, observation events, and observed data, opinions, sources of opinions, published related papers, and the like. Besides, the microparticle-related data can also include a time stamp to mark time of observation or opinion generation.

In the example of annotating the microparticle-related data, the research institutions, research projects, instruments, and certifiers can be summarized as sources of microparticle-related data. The observation events and observed data can be summarized as data content of microparticle-related data. The opinions, sources of opinions and published related papers can be summarized as theoretical research data of microparticle-related data. The source, data content, and opinions of microparticle-related data can also include other content. And the sources and data content of microparticle-related data can also be summarized as observation data of microparticle-related data.

The annotating unit 603 annotates the microparticle-related data input into the database 600 from left side, e.g., the microparticle-related data imported into the database 600 from other databases or observation stations (or institutes). The annotating unit 603 also annotates the microparticle-related data input into the database 600 from right side, e.g., the observation data input to the database 600 by external observation devices or theoretical research data such as new opinions generated by other researchers after referring to the microparticle-related data in the data system herein.

A feature association unit 604 associates the annotated microparticle-related data, and the feature association unit 604 associates the same or similar observation data or theoretical research data according to the annotation information in the microparticle-related data.

Feature association is a tool box for data analysis and data relationship management for the annotation information in the microparticle-related data imported in batches and matrix data of cosmic space. A method of feature association is closely related to theoretical development of cosmic space data classified by XYZS, which mainly includes: a feature value extraction of data content in the same annotation, a definition of an association relationship, and a demand adaptation of application modes in a variety of scenarios. The methods and tools used in data analysis and relationship management are not limited to factor analyses, classifications, clustering, decision trees, neural networks, and knowledge graphs.

The feature association can, for example, perform keyword matching or semantic analyses on annotation content in the microparticle-related data, such as theoretical research data, and associate theoretical research data with the same keywords or semantically similar ones, e.g., associating similar opinions, and annotating a plurality of associated theoretical research data with the same cluster identifier, and certain microparticle-related data related to the theoretical research data also have a corresponding cluster identifier. After obtaining certain microparticle-related data, the researcher agrees on corresponding opinions. Other theoretical research data with similar opinions and other relevant observation data can be obtained through the theoretical research data of the microparticle-related data. After developing new opinions (i.e., theoretical research data) through research of some observation data, the researcher can search for theoretical research data with similar opinions, and read corresponding observation data to further improve his/her opinions, or find observation data similar to the observation data currently studied. For example, the observation instrument is similar, and the instrument is configured with similar parameters, and search the theoretical research data (i.e., opinions) of other researchers who obtained the opinions based on the observation data.

An approach of flag bit can also be adopted for the feature association. A flag bit is set in an annotation of each data in the microparticle-related data and a mark in the flag bit is matched with a mark in the flag bit in the same annotation. For example, if a flag bit of one microparticle-related data source is annotated as an observation station 01, and a flag bit of the other microparticle-related data source is annotated as an observation station 02, the two microparticle-related data sources are not associated. If the flag bit of the other microparticle-related data source is annotated as the observation station 01, the two microparticle-related data sources are associated and the association relationship is recorded.

Researchers scattered all over the world can obtain relevant data about the four types of microparticles through the data system of the embodiments herein for research. Researchers can also add new theoretical research data to the previous microparticle-related data researched through a researcher input unit 605, and the new theoretical research data are annotated by the annotating unit 603, and the feature association unit 604 associates the newly added theoretical research data with other relevant data. The researchers can also initiate through the researcher input unit 605 a data request to the data system of the embodiments herein, requesting the data system of the embodiments herein to acquire the specified microparticle-related data from the designated research institution or observation station, or the researchers can also input new microparticle-related data, such as observation data of a certain microparticle, to the data system of the embodiments herein through the researcher input unit 605, so that the microparticle-related data of the data system of the embodiments herein can be enriched.

The researchers can also obtain a plurality of relevant microparticle-related data of the data system of the embodiments herein through a site memory unit 606 for horizontal comparison. For example, taking an observation event as an example, the researchers can input an observation event to the site memory unit 606, and the site memory unit 606 finds all related microparticle-related data of the observation event. For example, observation data and theoretical research data for the observation event of different observation institutions are included, or observation data and theoretical research data for the observation event under different observation conditions are included, or observation data and theoretical research data for the observation event in a time axis manner can also be included. A plurality of microparticle-related data are horizontally compared to facilitate the researchers to conduct research.

The researchers can also obtain a plurality of relevant microparticle-related data of the data system of the embodiments herein through the site memory unit 606 for historical comparison. For example, taking an observation instrument as an example, the researchers can input historical observation data of an observation instrument of an observation station to the site memory unit 606. The site memory unit 606 finds out historical observation data of a specified observation instrument of the observation station along with, e.g., information such as observation conditions and instrument parameters during a certain observation, which can thus facilitate the researchers to compare the historical observation data.

The data system of the embodiments herein is connected to the external observation device through an intelligent engine unit 607 and a network, e.g., connected to the observation device of the observation station through the network. The external observation device not only acquire microparticle-related data from the data system of the embodiments herein through the intelligent engine unit 607, but also store the microparticle-related data (mainly the observation data obtained by the external observation device during the observation) in the data system of the embodiments herein through the intelligent engine unit 607.

The external observation device can acquire observation parameters and observation data of the same type observation device from the intelligent engine unit 607 (the same type observation device is an accurate observation device who has been adjusted), and use the observation parameters to set the external observation device and perform an observation, and then compare the observation data with the acquired observation data. If the comparison results are inconsistent, it means that there is an error in the external observation device and adjustments are required. The corresponding parameters can be revised until the observation data are the same or similar to the acquired observation data. If the comparison results are consistent, it means that the observation results of the external observation device are accurate and observation tasks can be performed.

The data system of the embodiments herein can also be connected to an external computing device through an algorithm service unit 608 and a network, e.g., connected to a computing device of an observation station through the network. The external computing device not only acquire the microparticle-related data from the data system of the embodiments herein through the algorithm service unit 608, but also store the microparticle-related data (mainly the result calculated by the external computing device based on the microparticle-related device, or algorithm models, formulae used when the external computing device performs calculations based on some microparticle-related data are included, and theoretical research data after the computing device performs calculations based on the microparticle-related data can also be included) in the data system of the embodiments herein through the algorithm service unit 608.

Figure 7:
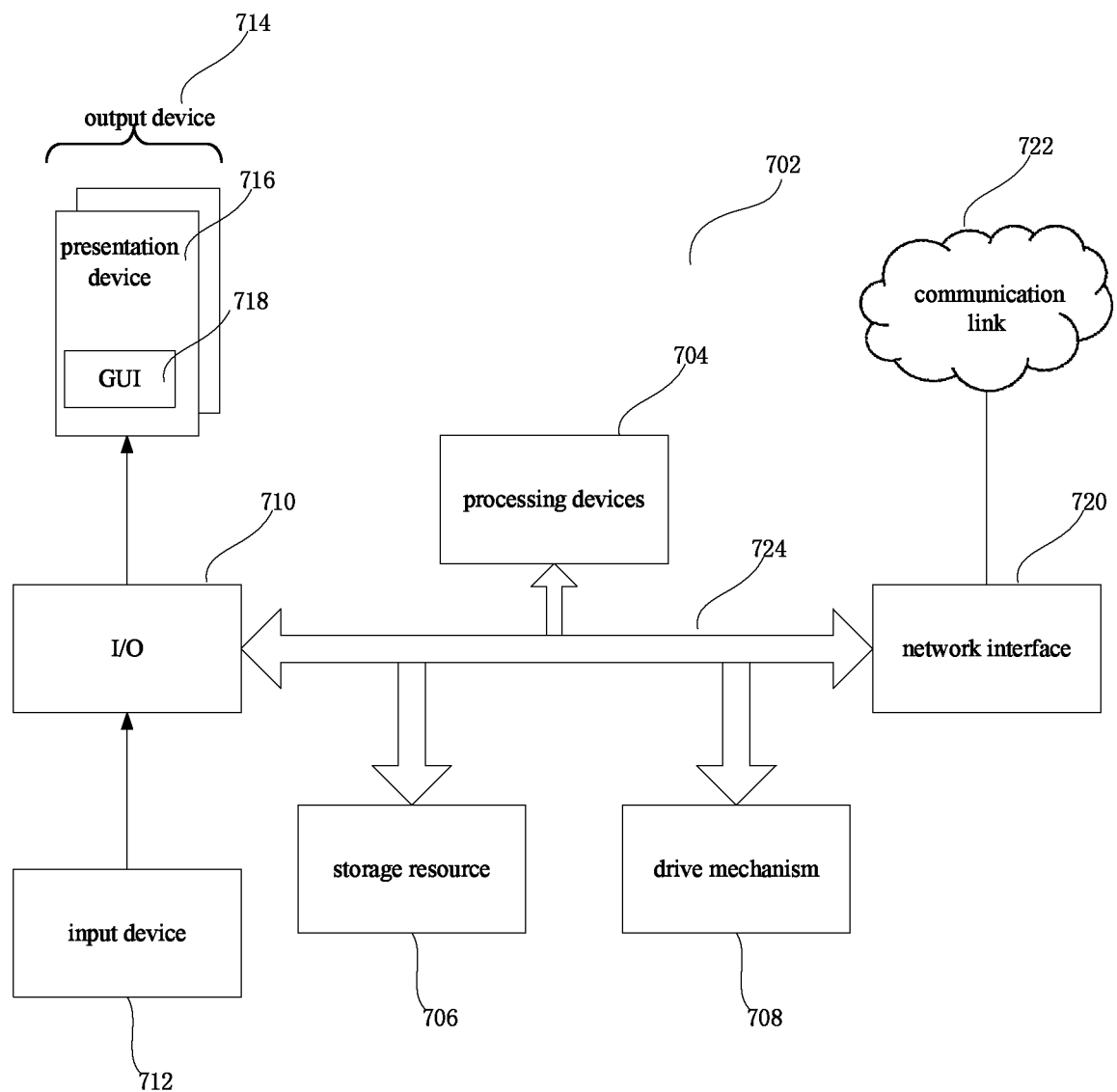
FIG. 7 is a schematic structural diagram illustrating a cosmic space data system according to an embodiment of the present disclosure.

FIG. 7 is a schematic structural diagram illustrating a cosmic space data system according to an embodiment of the present disclosure. In this embodiment, a structure of a data system is described. The cosmic space data system is called a computing device in this embodiment. A computing device 702 can include one or more processing devices 704, such as one or more central processing units (CPUs), each of which may implement one or more hardware threads. The computing device 702 can also include any storage resources 706 for storing any kind of information such as codes, settings, data, etc. Without limitation, for example, the storage resource 706 may include any one or a combination of: any type of RAM, any type of ROM, flash memory devices, hard disks, optical disks, or the like. More generally, any storage resource can use any technology to store information. Further, any storage resource may provide a volatile or non-volatile retention of information. Further, any storage resource may represent a fixed or removable component of the computing device 702. In one case, the computing device 702 may perform any operation of the associated instructions when the processing device 704 executes an associated instruction stored in any storage resource or a combination of storage resources. The computing device 702 also includes one or more drive mechanisms 708 for interacting with any storage resources, such as hard disk drive mechanisms, optical disk drive mechanisms, or the like.

The computing device 702 may also include an input/output module 710 (I/O) configured to receive a variety of inputs (via an input device 712) and provide a variety of outputs (via an output device 714). A specific output device may include a presentation device 716 and an associated graphical user interface (GUI) 718. In other embodiments, the input/output module 710 (I/O), the input device 712, and the output device 714 may not be included, and it is only used as a computing device in the network. The computing device 702 can also include one or more network interfaces 720 for exchanging data with other devices via one or more communication links 722. One or more communication buses 724 couple the above-described components together.

The communication link 722 can be implemented in any manner, for example, a local area network, a wide area network (for example, the Internet), point-to-point connections, or any combination thereof. The communication link 722 can include any combination of hardwired links, wireless links, routers, gateway functionality, name servers governed by any protocol or a combination of protocols.

The embodiments herein also provide a computer device, comprising: a memory, a processor, and a computer program stored in the memory and running on the processor, and the system is implemented when the processor executes the computer program:

storing input microparticle-related data according to types of microparticles;

annotating the stored microparticle-related data; and establishing an association relationship of the stored microparticle-related data according to the annotation.

In addition, the computer device in the embodiments herein can also implement all the solutions in FIGS. 1 to 6.

Corresponding to the solutions in FIGS. 1 to 6, the embodiments herein also provide a computer-readable storage medium having a computer program stored on the computer-readable storage medium. The steps of the method are executed when the computer program is run by a processor, and all data processing and control processes in a corresponding system can be implemented.

The embodiments herein also provide a computer-readable instruction, wherein when the processor executes the instruction, the program therein causes the processor to execute the solutions as shown in FIGS. 1 to 6.

It should be understood that a size of a serial number of the above-mentioned processes in the embodiments herein does not mean an order of execution, and the order of execution of each process should be determined by its function and internal logic, and should not constitute any limitation to the implementation process of the embodiments herein.

It should also be understood that, in the embodiments herein, a term "and/or" is merely an association relationship describing associated objects, and means that there may be three relationships. For example, A and/or B can mean: A exists alone, A and B exist simultaneously, and B exists alone. In addition, the character "I" herein generally indicates that the associated objects are in an "or" relationship.

Those skilled in the art can realize that the units and algorithm steps of the examples described in the embodiments disclosed herein can be implemented by an electronic hardware, a computer software, or a combination thereof. In order to clearly illustrate interchangeability between hardware and software, the composition and steps of each example have been generally described in accordance with functions in the above description. Whether these functions are executed by hardware or software depends on specific disclosures and design constraints of the technical solutions. Those skilled in the art can adopt different methods for each specific disclosure to implement the described functions. However, such an implementation should not be considered beyond the scope of the present disclosure.

Those skilled in the art can clearly understand that, for the convenience and conciseness of description, refer to the corresponding process in the foregoing method embodiment for the specific operation process of the system, device, and units described above, which will not be described hereinafter in detail.

In the multiple embodiments provided herein, it should be understood that the disclosed system, device, and method can be implemented in other manners. For example, the device embodiments described above are merely illustrative. For example, a division of the units is only a logical function division, and there may be other divisions in an actual implementation. For example, a plurality of units or components can be combined or integrated into another system, or some features can be ignored or not implemented. In addition, the displayed or discussed mutual coupling or direct coupling or communication connection can be an indirect coupling or communication connection through some interfaces, devices or units, and the connection can also be realized in electrical, mechanical or other forms.

The units as separate components may or may not be physically separated, and the components displayed as units may or may not be physical units. That is, they can be located in one place, or they can be distributed over a plurality of network units. Some or all of the units can be selected according to actual needs to achieve the objectives of the solutions of the embodiments herein.

In addition, the functional units in the embodiments herein can be integrated into one processing unit, or can physically exist alone, or two or more units can be integrated into one unit. The integrated unit can be realized in a form of hardware or in a form of a software functional unit.

If implemented in the form of the software functional unit and sold or used as a separate product, the integrated unit can be stored in a computer readable storage medium. Based on this understanding, a part of the technical solutions in the present disclosure that essentially makes contributions to the prior art, or all or part of the technical solutions can be embodied in the form of the software product, and the computer software product is stored in a storage medium, including a plurality of instructions to enable a computer device (which can be a personal computer, a server, or a network device) to execute all or part of the steps of the method in the embodiments herein. The aforementioned storage media include: a U disk, a mobile hard disk, a read-only memory (ROM, Read-Only Memory), a random access memory (RAM, Random Access Memory), a magnetic disk or an optical disk that can store program codes.

Specific embodiments are used in the present disclosure to illustrate the principles and implementation of the present disclosure. The descriptions of the embodiments are only used to help understand the methods and core ideas of the present disclosure. Meanwhile, for those skilled in the art, there will be changes in the specific implementation and the scope of disclosure according to the ideas of the present disclosure. In summary, the disclosure contained in this specification should not be construed as a limitation to the present disclosure.

The invention claimed is:

1. A cosmic space data system, wherein the system is implemented in a computer device comprising a memory, a processor, and a computer program stored in the memory and running on the processor, wherein the system comprises:
　　a data import unit configured to store input microparticle-related data according to types of microparticles, wherein the data import unit further comprises:
　　　　code mapping module configured to map string-related data into code X, map subatom-related data into code Y, map neutrino-related data into code Z, and map phonon-related data into code S; and
　　　　a metadata import module configured to store the string-related data in a database space X, store the subatom-related data into a database space Y, store the neutrino-related data in a database space Z, and store the phonon-related data in a database space S;

an annotating unit configured to annotate the stored microparticle-related data;

a feature association unit configured to establish an association relationship of the stored microparticle-related data according to the annotation, wherein the feature association unit is further configured to associate sources of the same type of microparticles, data content of the same type of microparticles, and theoretical research data of the same type of microparticles; and an intelligent engine unit, wherein the intelligent engine unit is configured to connect to an external observation device for observing micro particles, wherein the intelligent engine unit receives the microparticle-related data from the external observation device and stores the microparticle-related data to the data import unit, and wherein the intelligent engine unit controls an operation of the external observation device according to a constraint condition, the constraint condition being a predetermined range of threshold values, wherein when a particle observation value is within the threshold range the external observation device operates normally, and wherein when the particle observation value exceeds the threshold range the external observation device is triggered to perform an observation task and store the microparticle-related data to the data import unit.

2. The system according to claim 1, wherein the annotating unit is further configured to annotate sources, data content, and theoretical research data of the stored microparticle-related data.

3. The system according to claim 1, further comprising one or more of a researcher input unit, a site memory unit, and an algorithm service unit, wherein the researcher input unit is configured for a researcher to write new microparticle-related data in specified microparticle-related data, wherein the site memory unit is configured to provide a researcher with a horizontal comparison of microparticle-related data and a historical comparison of microparticle-related data, and wherein the algorithm service unit is configured to connect an external computing device and perform a data interaction with the external computing device.

4. The system according to claim 1, wherein the intelligent engine unit transmits the microparticle-related data to a corresponding external observation device, so that the external observation device is calibrated according to the received microparticle-related data, wherein the intelligent engine unit is configured to:

receive an identifier which identifies a type of the external observation device, find calibration parameters and corresponding observation data of the same type of external observation device, transmit the calibration parameters and corresponding observation data to the external observation device, and set parameters of the external observation device based on the calibration parameters of the same type of external observation device.

5. The system according to claim 1, wherein the intelligent engine unit controls an operation of a first external observation device according to an observation state of a second external observation device.

6. A method of collecting cosmic space data, comprising:

storing input microparticle-related data according to types of microparticles, wherein string-related data are mapped into code X, subatom-related data are mapped into code Y, neutrino-related data are mapped into code Z, and phonon-related data are mapped into code S; and wherein the string-related data are stored in a database space X, the subatom-related data are stored into a database space Y, the neutrino-related data are stored in a database space Z, and the phonon-related data are stored in a database space S;

annotating the stored microparticle-related data;

establishing an association relationship of the stored microparticle-related data according to the annotation, wherein said microparticle-related data comprises a source, data content and theoretical research data, and if one of said data is the same, the association relationship of the stored microparticle-related data is established; and performing data interaction with an external observation device for observing microparticles and receiving the microparticle-related data from the external observation device and storing the microparticle-related data, wherein said external observation device is remotely driven to operate according to a constraint condition, the constraint condition being a predetermined range of threshold values, wherein when an observed particle observation value is within the range of threshold values, the external observation device operates normally, and when the observed particle observation value exceeds the range of threshold values, a specific external observation device is triggered to perform an observation task.

7. A non-transitory computer-readable storage medium having a computer program stored on the non-transitory computer-readable storage medium, wherein the method according to claim 6 is implemented when the computer program is executed by a processor.

* * * * *